United States Patent
Chandrasekaran

(10) Patent No.: US 8,217,952 B2
(45) Date of Patent: Jul. 10, 2012

(54) TECHNIQUES FOR CACHING IMAGES

(75) Inventor: Karthik Chandrasekaran, Bangalore (IN)

(73) Assignee: Novell, Inc., Provo, UT (US)

( * ) Notice: Subject to any disclaimer, the term of this patent is extended or adjusted under 35 U.S.C. 154(b) by 896 days.

(21) Appl. No.: 12/323,564

(22) Filed: Nov. 26, 2008

(65) Prior Publication Data

US 2010/0131714 A1    May 27, 2010

(51) Int. Cl.
G06T 9/00 (2006.01)
G09G 5/36 (2006.01)
(52) U.S. Cl. .......... 345/557; 345/555
(58) Field of Classification Search ............ 345/555, 345/557; 711/124, E12.037
See application file for complete search history.

(56) References Cited

U.S. PATENT DOCUMENTS

| 6,343,160 | B1 | 1/2002 | Giannetti et al. |
| 6,721,846 | B2 | 4/2004 | Mund et al. |
| 6,738,526 | B1 | 5/2004 | Betrisey et al. |
| 6,928,516 | B2 | 8/2005 | Reuter |
| 7,042,587 | B2 | 5/2006 | Fiske |
| 7,130,480 | B2 | 10/2006 | Betrisey et al. |
| 7,664,173 | B2 * | 2/2010 | Nakano ............ 375/240 |
| 2003/0147561 | A1 * | 8/2003 | Faibish et al. ......... 382/245 |
| 2005/0243097 | A1 | 11/2005 | Cohen et al. |

* cited by examiner

*Primary Examiner* — Hau Nguyen

(74) *Attorney, Agent, or Firm* — Schwegman, Lundberg & Woessner, P.A.

(57) ABSTRACT

Techniques for caching images are presented. A matrix of pixel values represents an image. A diagonal of the matrix is used as an array of numbers representing an index value. The index value is compared to existing index values housed in a cache. When no match is present, the index value is inserted into the cache and the corresponding image associated with the inserted index value acquired. When a match is present no action is taken on the index values of the cache.

14 Claims, 3 Drawing Sheets

TECHNIQUES FOR CACHING IMAGES

BACKGROUND

Increasingly, search and retrieval techniques for non-text based data are becoming desirable. Text-based searching has improved by leaps and bounds over the Internet and the World-Wide Web (WWW) in recent years. Virtually everyone is familiar with the ever-popular Internet search engine Google®. Yet, very little improvement or advancement has been made with respect to image search and retrieval.

One of the most common approaches to searching images is to affix text labels and text metadata with images and then permit a text search to retrieve image data by matching to the metadata and then linking to the images. In fact, this is an approach that Google® users. However, the text-based approach requires retrofitting image data with proper metadata and also does not permit a raw image to be used as a search; rather, an image has to first be described in text terms before a search can proceed.

In addition to user-initiated searches, many searches are performance based and done unbeknownst to the users. That is, to improve response times for users that seek information and resources over a network, such as the Internet, behind the scenes services conduct search for that information within a cache to see if it is already present and can be quickly delivered to the user. When a cache search is unsuccessful, this produces a cache miss and results in the desired information being acquired from its source. Because searching the cache takes some time, if misses are more frequent then the user's response times can quickly degrade such that the cache implementation becomes more of a liability rather than a benefit to the user.

Cache misses are particularly prevalent when images are cached because the techniques for searching images are not that robust and suffer from many drawbacks as discussed above. Thus, when a cache is heavily populated with images the cache misses steadily increase and administrators question whether a cache-based solution is even viable.

Thus, what are needed are techniques, which allow for improved caching of images.

SUMMARY

In various embodiments, techniques for caching images are presented. More specifically, and in an embodiment, a method is provided that caches images.

DETAILED DESCRIPTION

As used herein an "image" refers to data depicted via pixels in a computer-readable storage medium. A series of images when combined with audio may be organized as a video. Additionally, the image may refer to a backup drive a client machine, backups of programs, data, and other information organized as an image.

A "cache" refers to memory accessible to or interfaced to a processor that provides quick access to information to requesters, such as users. The cache includes index values as described in greater detail herein and below. Each index value links to a specific image that may also be in memory or in storage.

According to an embodiment, the techniques presented herein are implemented in products associated and distributed by Novell®, Inc. of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit various aspects of the invention.

It is within this initial context, that various embodiments of the invention are now presented with reference to the FIGS. 1-4.

Figure 1:
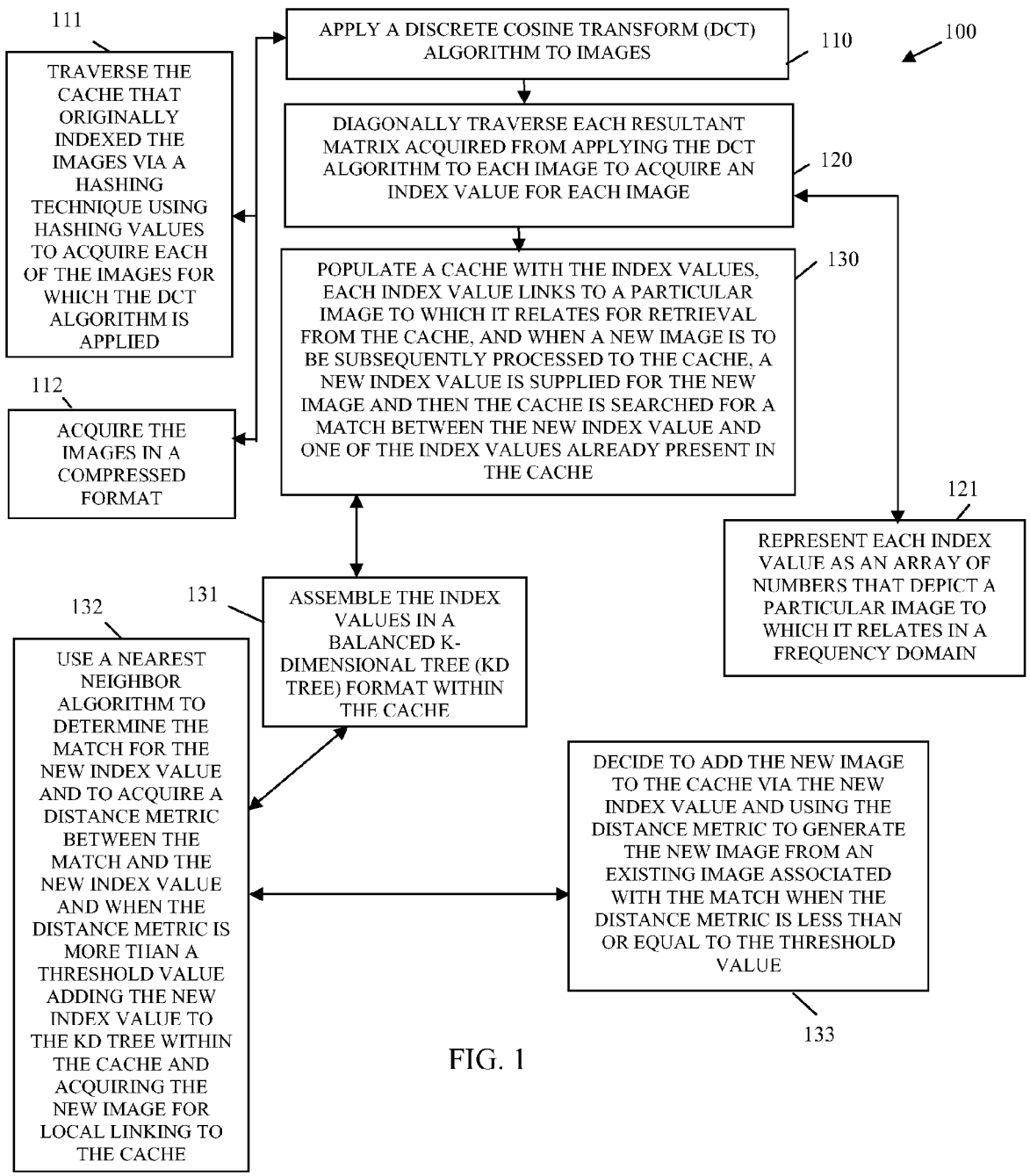
FIG. 1 is a diagram of a method for caching images, according to an example embodiment.

FIG. 1 is a diagram of a method 100 for caching images, according to an example embodiment. The method 100 (hereinafter "image caching service") is implemented as instructions in a machine-accessible and computer-readable storage medium. The instructions when executed by a machine (processing device, processor, computer, etc.) perform the processing depicted in FIG. 1. The image caching service is also operational over and processes within a network. The network may be wired, wireless, or a combination of wired and wireless.

At 110, the image caching service applies a discrete cosine transform (DCT) algorithm to images. The purpose of this is to (as discussed more completely herein and below) populate a cache with novel index values for images that are to be housed in the cache.

According to an embodiment, at 111, the image caching service traverses the cache. The cache original included hash values for images that were created via a hashing technique. Each hash value is acquired from the cache and its corresponding image acquired via a linking mechanism used by the cache to link the original hash values to the cache. In this manner, the image caching service can reorganize an existing cache that uses hash values in the manners discussed herein and below.

In another situation, at 112, the image caching service acquires the images in a compressed format, such as but not limited to, JPEG. So, the images themselves may exist in a compressed format when initially processed by the image caching service.

At 120, the image caching service diagonally traverses each resultant matrix acquired by applying the DCT algorithm to each image. This is done to generate an index value for each image. So, each index value is a diagonal array of numbers for pixels that exist in a DCT generated matrix, which represents a particular image.

In an embodiment, at 121, as mentioned above at 120, each index value is essentially represented as an array of numbers that depict a particular image to which that index value relates within a frequency domain for the pixels of the image as opposed to a space domain.

At 130, the image caching service populates a cache with the index values. Each index value links to a particular image to which it relates for subsequent retrieval from the cache. So, when a new image is to be subsequently processed to the cache, a new index value is supplied for that new image. The new index value is used to search the cache for a match between the new index value and the existing index values housed in the cache already by the image caching service. The index value may be supplied via a remote server that interacts with the image caching service, the remote server may be a vendor or supplier of the new image. So, the image caching service does not need to have the new image in its possession to conduct the search of the cache and to populate the cache with the new index value, if a match is not found from the cache against the new index value.

According to an embodiment, at 131, the image caching service assembles the index values in a balanced k-dimensional (KD) (multidimensional) tree format or data structure within the cache. Thus, the cache is a balanced KD tree of index values produced for each image as a diagonal of numbers acquired from a DCT generated matrix that depicts each image.

Continuing with the embodiment at 131 and at 132, the image caching service uses a nearest neighbor algorithm to determine the match for the new index value and to acquire a distance metric between the match and the new index value, such that when the distance metric is more than a threshold value, the new index value is added to the KD tree within the cache and then new image is acquired for local linking to the cache.

Continuing with the embodiment at 132 and at 133, the image caching service decides to add the new image to the cache via the new index value and the distance metric is used to generate the new image from an existing image associated with the match when the distance metric is less than or equal to the threshold value. So, here an exact match is not needed and if a non-exact match is found within a defined threshold, then the new image does not have to be acquired from its source over the network; rather, the distance metric can be applied to the nearest matching image from the corresponding matching index value of the cache to generate the new image within the local processing environment of the image caching service.

This saves network bandwidth and improves overall cache performance. In fact, the new image may just be stored locally within the local processing environment as the distance metric with a pointer to the nearest matching image, in this manner dynamic generation of the new image can occur as needed and further storage space can be saved within the local processing environment.

Now an example illustration and implementation is presented for purposes of comprehension along with benefits of the proposed techniques discussed herein.

A DCT is used to index the image. DCT is similar to Fourier Transform which transforms images from a space to a frequency domain. DCT is used in the JPEG compression algorithm. By applying DCT, a 16×16 matrix of pixels, which comprise the image is converted into another 16×16 matrix. Traversing the resultant matrix diagonally gives an array of numbers, which is used to index the particular image. By using the resultant array as an index, one can determine if a new image matches the set of images in the cache even if the new image differs by 1 or 2 pixels or a threshold value of pixels. This can be achieved by using a Nearest Neighbor algorithm on the array of numbers to determine which index value is the closest matching image. If a distance metric is larger than a certain threshold, then the image is said not to match any of the images and is added as a new entry in the cache. The Nearest Neighbor algorithm used via a KD tree. The KD tree is an implementation of the Nearest Neighbor algorithm that uses a binary tree for indexing and searching through the images. A KD tree (again short for k-dimensional tree) is a space-partitioning data structure for organizing points in a k-dimensional space. KD trees are useful data structures for several applications, such as searches involving a multidimensional search key (e.g. range searches and nearest neighbor searches, etc.).

Previously, hashing was used for caching the images. In hashing, if the hash value of one image does not match the hash value of another, the images are not considered to match. Hence, the cache hit rate was very low. With the techniques and embodiments presented herein, the array of numbers used for indexing is obtained by applying the DCT algorithm to the pixel matrix. This array of numbers characterizes the pixel information in the matrix. Hence, the array of numbers can be used for a nearest neighbor search for the nearest matching image in the cache and this improves the cache hit rate and hence the cache performance.

If a new image differs from the cache entry by only a few pixels, then only the difference between the two array of numbers is obtained by applying the DCT algorithm on the two images; so, only the difference need to be sent over the network. Thus, the proposed techniques reduce the network bandwidth usage.

The images in the cache on the client side can be compressed using JPEG compression for storage so that disk space on client side is saved.

Since a KD tree is used as the data structure for storing the array of numbers from the DCT algorithm, the access time for obtaining the nearest matching image is only order log(n) where n is the number of images in cache.

The image is divided into a set of 16×16 square matrices of pixel values. A Discrete Cosine Transform (DCT) algorithm is applied to each of the square matrices and another set of 16×16 square matrices containing the frequency components of the image pixel values is obtained. The DCT algorithm is similar to Fourier transform except that the resulting list of values is twice the length of Fourier transform and only real values are returned by the DCT. DCT is extensively used in image compression the typical example being JPEG compression.

This matrix contains a number of zeros since the higher frequency components of the pixel values are typically removed. The 16×16 matrix is traversed diagonally starting from a bottom-most element and an array of values is obtained. This array is used as the index into the cache. The array of numbers represents the image but in the frequency domain.

The array of values is indexed in a KD tree, which is the cache. A KD tree is a Binary Search tree used for storing multidimensional data and can efficiently handle range queries and nearest neighbor queries. The array of values obtained from DCT is indexed into the KD tree. The KD tree is efficient and can handle nearest neighbor queries in O(log n) time.

```
Algorithm CacheCreation      /* Cache is implemented as a KD tree */
/* Input Parameters */
* list of points - pointList
* int - depth
*/
Begin
    if pointlist is empty
        return nil;
    else
        // Select axis based on depth so that axis cycles through all the
        // entries in the array of index obtained through DCT
        var int axis = depth mod k
        // Sort list of all array of values corresponding to the various
        // images to be cached, and choose median as pivot element
        select median from pointList
```

```
// Create cache entries and construct subtrees
var tree_node node
    node.location = median
    node.leftChild = CacheCreation( pointsin pointList before
        median, depth + 1)
    node.rightChild = CacheCreation( pointsin pointList after
        median, depth + 1)
    return node
End
```

The above algorithm CacheCreation routine creates the cache entries with the array of values returned by the DCT algorithm. As one moves down the tree, one cycles through the axes. At each step, the median of the points is being put into the KD tree, with respect to their coordinates in the axis being used. This method leads to a balanced KD tree, in which each leaf node is about the same distance from the root.

Algorithm for inserting an entry into the cache:
1. Traverse the tree, starting from the root and moving to either the left or right child dependent on whether the point to be inserted is on the "left" of the "right side of the median.
2. Once a leaf node is obtained, add the new point as either the left or right child or the leaf node again depending on which side of the node's median contains the new point.

Algorithm for detecting a cache hit through a Nearest Neighbor Search:
1. The root node is examined with an initial assumption that the smallest distance to the next point is infinite.
2. The sub-domain (right or left) containing the target point is searched.
3. This is done recursively until a final minimum region containing the node is found.
4. Each parent node is examined (via recursion), to see if it is possible for other domains to have a point that is closer.
5. This is repeated until all domains are either searched or discarded, thus leaving the nearest neighbor as the final result.

The presented novel techniques of caching may also be extended to videos or sequence of images where a 3-dimensional DCT is used for indexing the videos or sequence of images. The 3 dimensions consist of two dimensions of pixel values and one time dimension representing the number of pixels being indexed.

The techniques of image indexing, via DCT, may also be extended to search engines for images and for implementation of database of images and searching through these images for nearest matches. For example, fingerprint databases are huge and the DCT technique of indexing may be used to index and search through these images. Similarly, facial recognition through biometrics may make use of indexing through DCT as presented herein.

Figure 2:
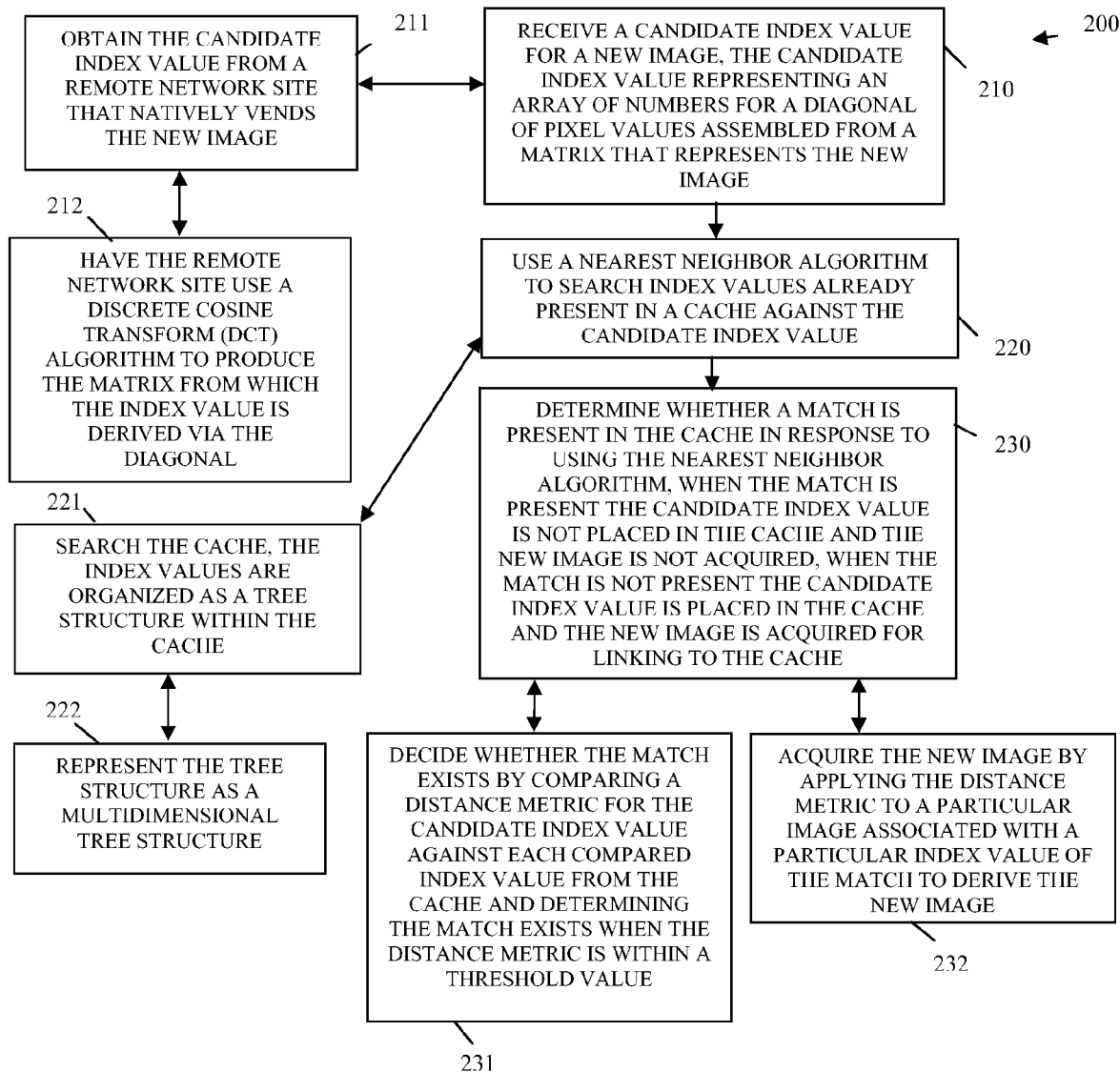
FIG. 2 is a diagram of another method for caching images, according to an example embodiment.

FIG. 2 is a diagram of another method 200 for caching images, according to an example embodiment. The method 200 (herein after referred to as "caching service") is implemented in a machine-accessible and computer-readable storage medium as instructions, which when accessed by a machine (processor) performs the processing depicted in the FIG. 2. The caching service is also operational over a network; the network may be wired, wireless, or a combination of wired and wireless.

The caching service represents another and in some cases an enhanced perspective to the image caching service represented by the method 100 of the FIG. 1.

At 210, the caching service receives a candidate index value for a new image. The candidate index value represents an array of numbers for a diagonal of pixel values assembled from a matrix that represents the new image. The new image itself and the matrix does not have to exists within a local processing environment; rather, the candidate index value for the image and its matrix is supplied or received by the caching service for purposes of the caching service deciding whether it exists in the cache already or needs to be added to the cache.

In an embodiment, at 211, the caching service obtains the candidate index value from a remote network site that natively vends the new image and retains the new image until and if the caching service ever asks for that new image.

Continuing with the embodiment at 211 and at 212, the caching service ensures that the remote network site, via a remote service, uses a DCT algorithm to produce the matrix from which the index value is derived via the diagonal.

At 220, the caching service uses a nearest neighbor algorithm to search existing index values already present in the cache against the candidate index value. That is, the cache is already populated with index values in accordance with the techniques discussed at length above with reference to the method 100 of the FIG. 1.

In an embodiment, at 221, the caching service searches the cache where the index values are organized as a tree data structure within the cache.

Continuing with the embodiment at 221 and at 222, the caching service represents the tree structure as a multidimensional tree structure having more than 1 dimension. So, each pixel of the image includes multiple dimensions or axis.

At 230, the caching service determines whether a match is present in the cache in response to using the nearest neighbor algorithm. So, when the match is present, the candidate index value is not placed in the cache and the new image is not acquired. Conversely, when the match is not present within the cache, the candidate index value is placed in the cache and the new image is acquired for linking to the cache.

According to an embodiment, at 231, the caching service decides whether the match exists by comparing a distance metric for the candidate index value against each compared index value from the cache and then determining whether the match exists when the distance metric is within a predefined threshold value.

In another case, at 232, the caching service acquires the new image by applying the distance metric to a particular image associated with a particular index value for the match for purposes of dynamically deriving the new image within the local processing environment of the caching service.

Figure 3:
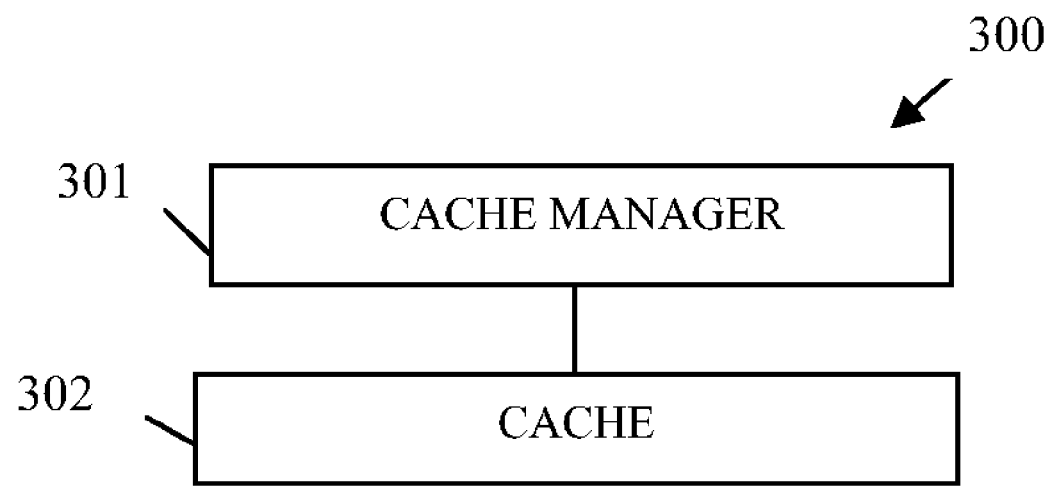
FIG. 3 is a diagram of an image caching system, according to an example embodiment.

FIG. 3 is a diagram of an image caching system 300, according to an example embodiment. The image caching system 300 is implemented in a machine-accessible and computer-readable storage medium as instructions, which when accessed by a machine (processor, computer, etc.) performs, among other things, the processing depicted in the methods 100 and 200 of the FIGS. 1 and 2, respective. The image caching system 300 is also operational over a network; the network may be wired, wireless, or a combination of wired and wireless.

The image caching system 300 includes a cache manager 301 and a cache 302. Each of these components and their interactions with one another will now be discussed in turn.

The cache manager 301 is implemented in a computer-readable storage medium as instructions that execute or process on a processor. Example processing associated with the cache manager was provided above in detail with reference to the methods 100 and 200 of the FIGS. 1 and 2, respectively.

The cache manager 301 maintains the cache 302 as a tree data structure. Each node of the tree represented as a particular index value that is linked to a particular image. The particular index value represents a diagonal of a pixel matrix that represents the particular image to which it relates.

The cache 302 is implemented in a computer-readable storage medium accessible to the cache manager 301 and within or accessible to the processor. Example aspects of the cache 302 was presented above with reference to the methods 100 and 200 of the FIGS. 1 and 2, respectively.

The cache 302 is searched when a candidate index value is supplied for purposes of determining whether a candidate image associated with the candidate index is represented within the tree data structure of the cache 302 that the cache manager 301 manages.

In an embodiment, the candidate index value is received remotely over a network connection for the network by the cache manager 301. This was described above with reference to the methods 100 and 200 of the FIGS. 1 and 2, respectively.

Continuing with the previous embodiment, the cache manager 301 uses a nearest neighbor algorithm to determine whether a match exists within the cache 302 for the candidate index value.

Still continuing with the last described embodiment, the cache manager 301 determines whether a match exists if the comparison between the candidate index value and the index values of the cache 302 falls within or below a predefined threshold.

In another case, the tree is a balanced KD tree.

In still another situation, the cache 302 is initially populated with hash values that the cache manager 301 converts to the index values by iterating the cache 302 to replace each of the hash values with a specific index value.

Figure 4:
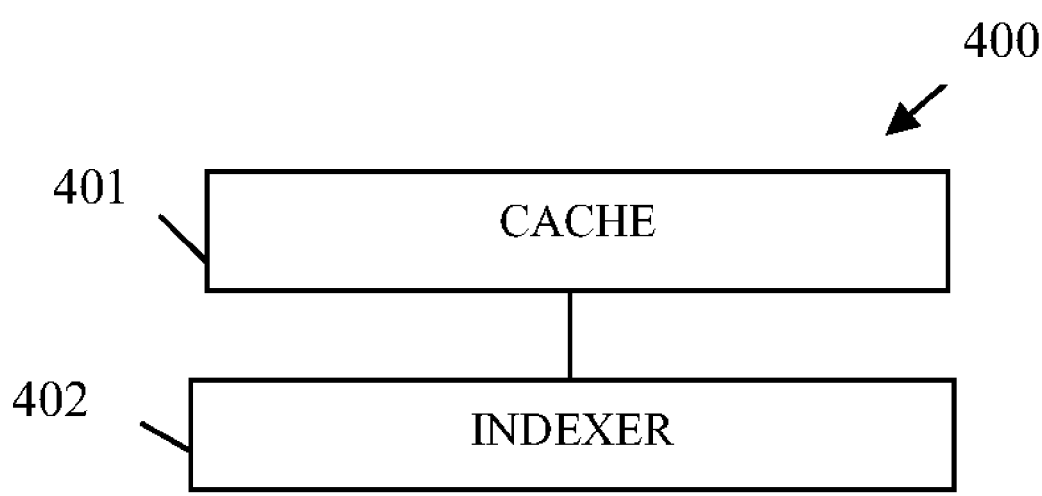
FIG. 4 is a diagram of another image caching system, according to an example embodiment.

FIG. 4 is a diagram of another image caching system 400, according to an example embodiment. The image caching system 400 is implemented as instructions on or within a machine-accessible and computer-readable storage medium. The instructions when executed by a machine perform, inter alia; the processing depicted with respect to the methods 100, 200 of the FIGS. 1-2, respectively. The image caching system 400 is also operational over a network and the network may be wired, wireless, or a combination of wired and wireless.

The image caching system 400 is another and in some cases enhanced perspective to the image caching system 300 represented by the FIG. 3, presented above.

The image caching system 400 includes a cache 401 and an indexer 402. Each of these will now be discussed in turn.

The cache 401 is implemented in a computer-readable storage medium and accessible to a processor. Example aspects and details for the cache 401 was presented above with reference to the methods 100 and 200 of the FIGS. 1 and 2, respectively, and with respect to the system 300 of the FIG. 3.

The cache 401 houses the index values produced by the indexer 402.

The indexer 402 is implemented in a computer-readable storage medium and processes or executes on a processor. Example aspects of the indexer 402 and details were provided above with reference to the methods 100 and 200 of the FIGS. 1 and 2, respectively, and with respect to the cache manager 301 represented above with respect to the system 300 of the FIG. 3.

The indexer 402 provides index values to house in the cache 401. So, the indexer 402 produces or receives each index value as an array of numbers. The array of numbers are acquired from a diagonal of a matrix of pixels that represents a particular image. Also, each index value is linked to its particular associated image.

According to an embodiment, the indexer 402 uses a DCT algorithm to produce each matrix.

Continuing with the previous embodiment, the indexer 402 acquires each image in compressed format.

In another situation, the indexer 402 maintains the index values as a balanced tree within the cache 401.

One now appreciates how improved image indexing, searching, and caching can be achieved from that which has been available in the industry.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method that uses a processor to perform the processing of:
    applying a discrete cosine transform (DCT) algorithm to images;
    diagonally traversing each resultant matrix acquired from applying the DCT algorithm to each image to acquire an index value for each image; and
    populating a cache with the index values, wherein each index value links to a particular image to which it relates for retrieval from the cache, and wherein when a new image is to be subsequently processed to the cache, a new index value is supplied for the new image and then the cache is searched for a match between the new index value and one of the index values already present in the cache, and assembling the index values in a balanced k-dimensional tree (KD tree) format within the cache, and using a nearest neighbor algorithm to determine the match for the new index value and to acquire a distance metric between the match and the new index value and when the distance metric is more than a threshold value adding the new index value to the KD tree within the cache and acquiring the new image for local linking to the cache.

2. The method of claim 1, wherein applying further includes traversing the cache that originally indexed the images via a hashing technique using hashing values to acquire each of the images for which the DCT algorithm is applied.

3. The method of claim 1, wherein applying further includes acquiring the images in a compressed format.

4. The method of claim 1, wherein diagonally traversing further includes representing each index value as an array of numbers that depict a particular image to which it relates in a frequency domain.

5. The method of claim 1, wherein populating further includes deciding to add the new image to the cache via the new index value and using the distance metric to generate the new image from an existing image associated with the match when the distance metric is less than or equal to the threshold value.

6. A computer-implemented method that uses a processor to perform the processing of:

receiving a candidate index value for a new image, the candidate index value representing an array of numbers for a diagonal of pixel values assembled from a matrix that represents the new image;

using a nearest neighbor algorithm to search index values already present in a cache against the candidate index value; and determining whether a match is present in the cache in response to using the nearest neighbor algorithm, when the match is present the candidate index value is not placed in the cache and the new image is not acquired, when the match is not present the candidate index value is placed in the cache and the new image is acquired for linking to the cache, and deciding whether the match exists by comparing a distance metric for the candidate index value against each compared index value from the cache and determining the match exists when the distance metric is within a threshold value.

7. The method of claim 6, wherein receiving further includes obtaining the candidate index value from a remote network site that natively vends the new image.

8. The method of claim 7, wherein obtaining further includes having the remote network site use a discrete cosine transform (DCT) algorithm to produce the matrix from which the index value is derived via the diagonal.

9. The method of claim 6, wherein using further includes searching the cache, wherein the index values are organized as a tree structure within the cache.

10. The method of claim 9, wherein searching further includes representing the tree structure as a multidimensional tree structure.

11. The method of claim 6, wherein determining further includes acquiring the new image by applying the distance metric to a particular image associated with a particular index value of the match to derive the new image.

12. A computer-implemented system, comprising:

a cache manager implemented in a computer-readable storage medium and to process on a processor; and a cache implemented in a computer-readable storage medium accessible to the processor; wherein the cache manager maintains the cache as a tree data structure, each node of the tree data structure represented as a particular index value linked to a particular image, and particular index value representing a diagonal of a pixel matrix that represents the particular image, and wherein the cache is searched when a candidate index value is supplied to determine whether a candidate image associated with the candidate index value is represented within the tree data structure, and wherein the candidate index value is received remotely over a network connection by the cache manager, and wherein the cache manager uses a nearest neighbor algorithm to determine whether a match exists within the cache for the candidate index value, and wherein the cache manager determines a match exists if the comparison between the candidate index value and the index values of the cache fall within or below a predefined threshold.

13. The system of claim 12, wherein the tree is a balanced k-dimensional tree (KD tree).

14. The system of claim 12, wherein the cache is initially populated with hash values that the cache manager converts to the index values by iterating the cache to replace each of the hash values with a specific index value.

\* \* \* \* \*